United States Patent
Chen et al.

(10) Patent No.: US 7,746,044 B2
(45) Date of Patent: Jun. 29, 2010

(54) POWER SUPPLY SYSTEM FOR MOTHERBOARD

(75) Inventors: Ying Chen, Shenzhen (CN); Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 527 days.

(21) Appl. No.: 11/829,099

(22) Filed: Jul. 27, 2007

(65) Prior Publication Data

US 2008/0203982 A1    Aug. 28, 2008

(30) Foreign Application Priority Data

Feb. 27, 2007    (CN) .......................... 2007 1 0200240

(51) Int. Cl.
*G05F 1/40*    (2006.01)
*H02J 1/00*    (2006.01)
(52) U.S. Cl. .................. 323/266; 323/351; 703/324
(58) Field of Classification Search .......... 323/266, 323/271, 282, 284, 299, 351; 703/300, 310, 703/320, 324, 340; 361/18, 91.1
See application file for complete search history.

(56) References Cited

U.S. PATENT DOCUMENTS

| | | | |
|---|---|---|---|
| 5,161,183 A | | 11/1992 | Maytum |
| 5,657,257 A | * | 8/1997 | Lee .............................. 713/321 |
| 6,198,262 B1 | * | 3/2001 | Squibb et al. ................ 323/273 |
| 6,713,992 B2 | * | 3/2004 | Matsuo et al. ............... 323/266 |
| 7,639,466 B2 | * | 12/2009 | Wang ......................... 361/91.1 |

* cited by examiner

*Primary Examiner*—Jessica Han
(74) *Attorney, Agent, or Firm*—Frank R. Niranjan

(57) ABSTRACT

A power supply system for a motherboard includes a voltage regulator circuit includes a system power source, and a voltage output terminal, a sampling circuit having an input, and an output receiving a high level sleep signal from a south bridge of the motherboard, a switching circuit having an input, and an output, a power connector having a control terminal connected to the output of the switching circuit, and a power source being connected to the power connector. When the voltage regulator circuit outputs a voltage greater than a predetermined stable voltage to the sampling circuit, the sampling circuit outputs a low level signal to the switching circuit which in return outputs a high level signal to the control terminal of the power connector to cut off power supply from the power source to the system power source.

20 Claims, 2 Drawing Sheets

POWER SUPPLY SYSTEM FOR MOTHERBOARD

BACKGROUND OF THE INVENTION

1. Field of the Invention

The present invention relates to a power supply system for a motherboard.

2. Description of Related Art

Power provided to a motherboard includes primary and secondary power. The motherboard uses a 24-pin ATX power connector to receive its primary power, and the primary power is regulated to provide secondary power according to different requirements of a plurality of chips on the motherboard. If the secondary power is not stable, for example, spikes to a high level, a north bridge or a south bridge may be burned out.

Referring to FIG. 1, a conventional 2.5V power supply system for a motherboard includes a 3.3V standby power source V11, a 3.3V system power source V12, a voltage divider 100, a linear adjuster 200, and a feedback resistor R13. The voltage divider 100 includes a resistor R11 and a resistor R12 connected in series. The 3.3V standby power source V11 is grounded via the voltage divider 100. The linear adjuster 200 includes an operational amplifier (OA) U11, and a N-channel Metal Oxide Semiconductor (NMOS) transistor Q11. A non-inverting input terminal of the OA U11 is connected to a node between the resistor R11 and the resistor R12. An inverting input terminal of the OA U11 is connected to a source of the NMOS transistor Q11 via the feedback resistor R13. An output terminal of the OA U11 is connected to a gate of the NMOS transistor Q11. The source of the NMOS transistor Q11 is grounded via a capacitor C11 for wave filtering. A drain of the NMOS transistor Q11 is connected to the 3.3V system power source V12.

Power from the 3.3V standby power source V11 is divided by the divider 100 so that a 2.5V voltage is delivered to the non-inverting input terminal of the OA U11. In the beginning, voltage at the inverting input terminal of the OA U11 is zero, so the output terminal of the OA U11 outputs a high level signal, then the NMOS transistor Q11 starts to turn on. The OA U11 acts as a short, so voltage at the inverting input terminal of the OA U11 is also 2.5V. Meanwhile, there is no current flowing through the non-inverting input terminal and the inverting input terminal of the OA U11. That is, there is no current flowing through the feedback resistor R13, so there is no voltage dropped across the resistor R13, so voltage at a node between the feedback resistor R13 and the source of the NMOS transistor Q11 is 2.5V, which is provided from the 3.3V system power source V12 via the NMOS transistor Q11. The 2.5V voltage is provided to a north bridge or a DDR1 memory of the motherboard. The voltage at the inverting input terminal of the OA U11 follows the voltage at the non-inverting input terminal of the OA U11 via the feedback resistor R13 to provide a stable voltage to a load.

Commonly, a short circuit develops between the drain and source of the NMOS transistor Q11 because of poor quality or workmanship. Thus, the power supply circuit loses its feedback function and a 3.3V output voltage is continuously provided to the 3.3V system power source V12. The 3.3V output voltage is far greater than an operating voltage of the north bridge or the DDR1 memory, which can destroy the north bridge or the DDR1 memory.

What is needed is a power supply circuit having an overvoltage protecting function for a motherboard.

SUMMARY OF THE INVENTION

An exemplary power supply system for a motherboard includes a voltage regulator circuit includes a system power source, and a voltage output terminal, a sampling circuit having an input, and an output receiving a high level sleep signal from a south bridge of the motherboard, a switching circuit having an input, and an output, a power connector having a control terminal connected to the output of the switching circuit, and a power source being connected to the power connector. When the voltage regulator circuit outputs a voltage greater than a predetermined stable voltage to the sampling circuit, the sampling circuit outputs a low level signal to the switching circuit which in return outputs a high level signal to the control terminal of the power connector to cut off power supply from the power source to the system power source.

Other advantages and novel features of the present invention will become more apparent from the following detailed description of preferred embodiment when taken in conjunction with the accompanying drawings, in which:

DETAILED DESCRIPTION OF THE INVENTION

Figure 1:
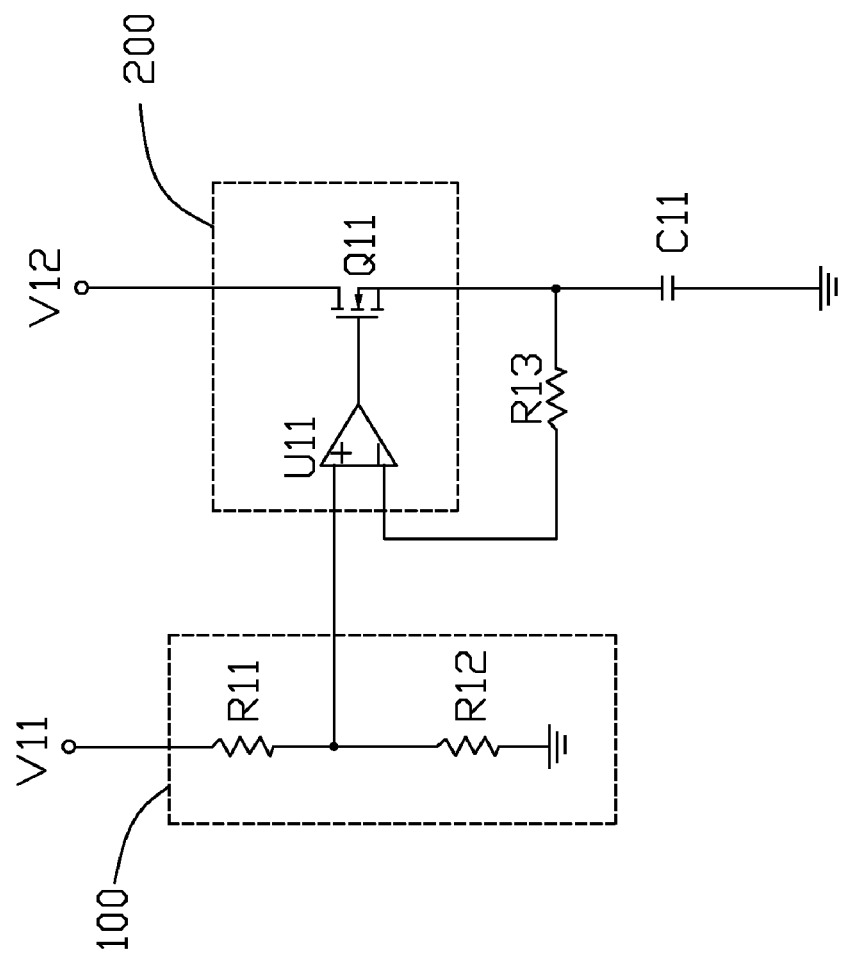
FIG. 1 is a diagram of a conventional 2.5V power supply system for a motherboard.
Figure 2:
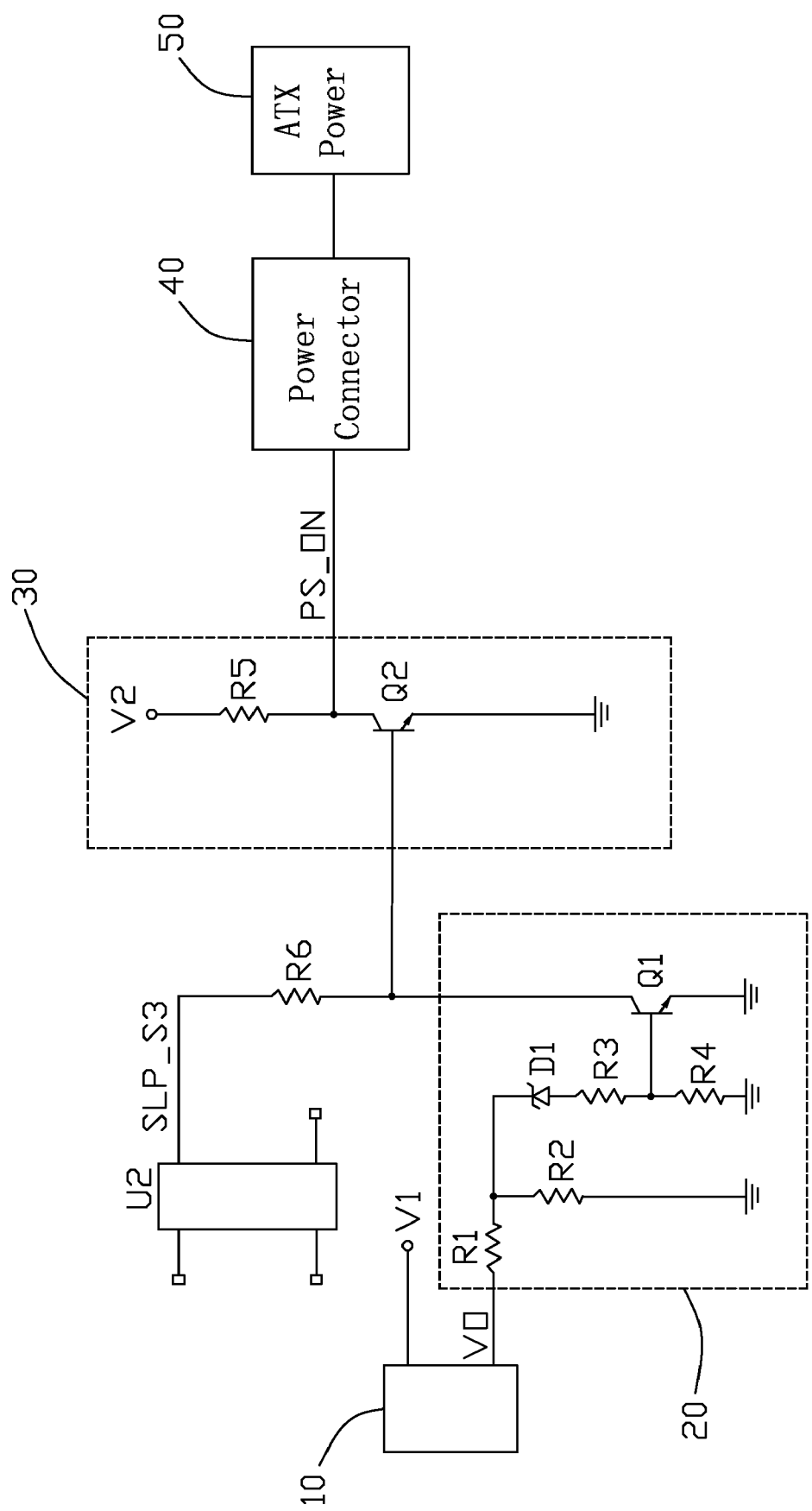
FIG. 2 is a diagram of a power supply system for a motherboard according to an embodiment of the present invention.

Referring to FIG. 2, a power supply system for a motherboard according to an embodiment of the present invention includes a voltage regulator circuit 10, a sampling circuit 20, a switching circuit 30, a power connector 40, and an ATX power source 50.

The voltage regulator circuit 10 includes a 3.3V system power source V1, and a voltage output terminal VO. When the voltage regulator circuit 10 works normally, the voltage output terminal VO outputs a stable 2.5V voltage provided by the 3.3V system power source V1. The stable 2.5V voltage is provided to a north bridge or a memory of the motherboard. If the voltage regulator circuit 10 develops a short circuit in the voltage regulator circuit 10, the voltage output terminal VO will output a 3.3V voltage directly from the 3.3V system power source V1.

The sampling circuit 20 includes resistors R1, R2, R3, and R4, a voltage regulator diode D1, and a transistor Q1. One end of the resistor R1 is connected as an input of the sampling circuit 20 to connect to the voltage output terminal VO of the voltage regulator circuit 10, the other end of the resistor R1 is connected to a cathode of the voltage regulator diode D1. The cathode of the voltage regulator diode D1 is grounded via the resistor R2. An anode of the diode D1 is grounded via the resistor R3 and the resistor R4. A base of the transistor Q1 is connected to a node between the resistor R3 and the resistor R4, an emitter of the transistor Q1 is grounded, a collector of the transistor Q1 is connected as an output of the sampling circuit 20.

The switching circuit 30 includes a resistor R5, a transistor Q2, and a 5V standby power source V2. A base of the transistor Q2 is connected as an input of the switching circuit 30 to connect to the output of the sampling circuit 20, an emitter of the transistor Q2 is grounded, a collector of the transistor Q2 is connected as an output of the switching circuit 30 to connect to the 5V standby power source via the resistor R5. The output of the sampling circuit 20 receives a sleep signal SLP_S3 from a south bridge U2 via a current limiting resistor R6. The sleep signal SLP_S3 is at a high level while the motherboard works normally, or at a low level while the motherboard is in a sleep state or a soft power-off state.

The power connector 40 is connected to the ATX power source 50. A controlling terminal of the power connector 40 is connected to the output of the switching circuit 30. In the embodiment, the power connector 40 is a 24-pin ATX power connector which is used to connect the ATX power source 50 to the motherboard.

When the voltage regulator circuit 10 works normally, the stable 2.5V voltage is provided to the input of the sampling circuit 20. Suppose that a stable voltage of the voltage regulator diode D1 is 1V, the resistor R1 and the resistor R2 divides the stable 2.5V voltage to make the voltage across the resistor R2 not greater than 1V. Thus, voltage at the cathode of the voltage regulator diode D1 is not greater than 1V, the voltage regulator diode D1 is not turned on. The transistor Q1 is turned off because a low level at the base of the transistor Q1, and the output of the sampling circuit 20 has no output signal. The sleep signal SLP_S3 from the south bridge U2 makes the transistor Q2 of the switching circuit 30 turn on via the current limiting resistor R6. The collector of the transistor Q2 is pulled down to output a low level power on signal PS_ON to the control terminal of the power connector 40, which makes the ATX power source 50 provide power to the motherboard normally.

When the voltage regulator circuit 10 outputs a voltage greater than the stable voltage, such as when a short circuit occurs, the 3.3V output voltage, which is greater than the stable 2.5V voltage, is provided to the input of the sampling circuit 20. The resistor R1 and the resistor R2 divide the 3.3V output voltage and a voltage across the resistor R2 is greater than 1V. Thus, voltage at the cathode of the voltage regulator diode D1 is greater than 1V, the voltage regulator diode D1 is turned on. The transistor Q1 is turned on, and the collector of the transistor Q1 is at a low level. That is, the output of the transistor Q1 outputs a low level signal. The low level signal from the transistor Q1 is transmitted to the base of the transistor Q2 to turn off the transistor Q2. The collector of the transistor Q2 outputs a high level power on signal PS_ON to the control terminal of the power connector 40, which makes the ATX power source 50 shut off all the power sources except the 5V standby power source V2. Because the 3.3V system power source V1 is shut off, there is no voltage output from the voltage output terminal VO of the voltage regulator circuit 10, which prevents the north bridge or the memory from being burned out because of the over voltage.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply system for a motherboard, comprising:
   a voltage regulator circuit comprising a system power source, and a voltage output terminal;
   a sampling circuit having an input, and an output, the input of the sampling circuit being connected to the voltage output terminal of the voltage regulator circuit, the output of the sampling circuit receiving a high level sleep signal from a south bridge of the motherboard;
   a switching circuit having an input, and an output, the input of the switching circuit being connected to the output of the sampling circuit;
   a power connector having a control terminal connected to the output of the switching circuit; and
   a power source being connected to the power connector, configured to provide power to the motherboard via the power connector;
   when the voltage regulator circuit outputs a predetermined stable voltage provided by the system power source, the sampling circuit has no signal output at the output, the switching circuit receives the high level sleep signal from the south bridge and outputs a low level signal to the control terminal of the power connector to make the power source provide power to the motherboard normally; when the voltage regulator circuit outputs an output voltage greater than the stable voltage, the sampling circuit outputs a low level signal, the switching circuit receives the low level signal from the sampling circuit and outputs a high level signal to the control terminal of the power connector to make the power source shut off the system power source of the voltage regulator circuit.

2. The power supply system as described in claim 1, wherein the power source is an ATX power source.

3. The power supply system as described in claim 1, wherein the system power source of the voltage regulator circuit is a 3.3V system power source on the motherboard.

4. The power supply system as described in claim 1, wherein the sampling circuit comprises a first resistor, a second resistor, a third resistor, a fourth resistor, a voltage regulator diode, and a first transistor, one end of the first resistor is connected as the input of the sampling circuit to connect to the voltage output terminal of the voltage regulator circuit, the other end of the first resistor is connected to a cathode of the voltage regulator diode, the cathode of the voltage regulator diode is grounded via the second resistor, an anode of the voltage regulator diode is grounded via the third resistor and the fourth resistor, a base of the first transistor is connected to a node between the third and the fourth resistor, an emitter of the first transistor is grounded, a collector of the first transistor is connected as the output of the sampling circuit.

5. The power supply system as described in claim 4, wherein when the stable voltage from the voltage regulator circuit is provided to the input of the sampling circuit, a voltage across the second resistor is not greater than a stable voltage of the voltage regulator diode, when the output voltage greater than the stable voltage from the voltage regulator circuit is provided to the input of the sampling circuit, the voltage across the second resistor is greater than the stable voltage of the voltage regulator diode to thereby turn on the first transistor to make the collector of the first transistor output the low level signal.

6. The power supply system as described in claim 4, wherein the switching circuit comprises a fifth resistor, a second transistor, and a standby power source, a base of the second transistor is connected as an input of the switching circuit to connect to the output of the sampling circuit, an emitter of the second transistor is grounded, a collector of the second transistor is connected as the output of the switching circuit to connect to the standby power source via the fifth resistor.

7. The power supply system as described in claim 6, wherein the standby power source is a 5V standby power source on the motherboard.

8. A power supply system for a motherboard, comprising:
   a voltage regulator circuit comprising a system power source, and a voltage output terminal, the voltage output terminal outputting a predetermined stable voltage provided by the system power source or a voltage of the system power source;

a sampling circuit having an input, and an output, the input of the sampling circuit receiving the voltage output from the voltage regulator circuit, the output of the sampling circuit receiving a high level sleep signal from a south bridge of the motherboard;

a switching circuit having an input, and an output, the input of the switching circuit being connected to the output of the sampling circuit;

a power connector having a control terminal connected to the output of the switching circuit; and a power source being connected to the power connector; when the sampling circuit receives the stable voltage from the voltage regulator circuit, the sampling circuit has no signal output at the output, the switching circuit receives the high level sleep signal from the south bridge and outputs a low level signal to the control terminal of the power connector to make the power source provide power to the motherboard normally; when the sampling circuit receives the voltage of the system power source from the voltage regulator circuit, the sampling circuit outputs a low level signal, the switching circuit receives the low level signal from the sampling circuit and outputs a high level signal to the control terminal of the power connector to make the power source shut off the system power source of the voltage regulator circuit.

9. The power supply system as described in claim 8, wherein the power source is an ATX power source.

10. The power supply system as described in claim 8, wherein the system power source
of the voltage regulator circuit is a 3.3V system power source on the motherboard.

11. The power supply system as described in claim 8, wherein the sampling circuit comprises a first resistor, a second resistor, a third resistor, a fourth resistor, a voltage regulator diode, and a first transistor, one end of the first resistor is connected as the input of the sampling circuit to connect to the voltage output terminal of the voltage regulator circuit, the other end of the first resistor is connected to a cathode of the voltage regulator diode, the cathode of the voltage regulator diode is grounded via the second resistor, an anode of the voltage regulator diode is grounded via the third resistor and the fourth resistor, a base of the first transistor is connected to a node between the third and the fourth resistor, an emitter of the first transistor is grounded, a collector of the first transistor is connected as the output of the sampling circuit.

12. The power supply system as described in claim 11, wherein when the stable voltage from the voltage regulator circuit is provided to the input of the sampling circuit, a voltage across the second resistor is not greater than a stable voltage of the voltage regulator diode.

13. A power supply system for a motherboard, comprising:
a voltage regulator circuit connected to a system power source of the motherboard, the voltage regulator circuit comprising a voltage output terminal for outputting a predetermined stable voltage, when the voltage regulator circuit works normally, to electronic components mounted on the motherboard;

a sampling circuit comprising an input connected to the output terminal of the voltage regulator circuit, and an output;

a switching circuit comprising an input connected to the output of the sampling circuit;

a power connector comprising a control terminal connected to the output of the switching circuit; and a power source connected to the power connector configured to provide power to the motherboard via the power connector; wherein when the output terminal of the voltage regulator circuit outputs a voltage greater than the predetermined stable voltage to the sampling circuit, the sampling circuit outputs a low level signal to the switching circuit which in return outputs a high level signal to the control terminal of the power connector to cut off power supply from the power source to the system power source.

14. The power supply system as described in claim 13, wherein the output of the sampling circuit receives a high level sleep signal from a south bridge of the motherboard, when the voltage regulator circuit works normally the high level sleep signal is output to the input of the switching circuit which in return outputs a low level signal to the control terminal of the power connector to make the power source provide power to the motherboard normally.

15. The power supply system as described in claim 13, wherein the sampling circuit comprises a first resistor, a second resistor, a third resistor, a fourth resistor, a voltage regulator diode, and a first transistor, one end of the first resistor acting as the input of the sampling circuit is connected to the voltage output terminal of the voltage regulator circuit, the other end of the first resistor is connected to a cathode of the voltage regulator diode, the cathode of the voltage regulator diode is grounded via the second resistor, an anode of the voltage regulator diode is grounded via the third resistor and the fourth resistor, a base of the first transistor is connected to a node between the third and the fourth resistor, an emitter of the first transistor is grounded, a collector of the first transistor acts as the output of the sampling circuit.

16. The power supply system as described in claim 13, wherein when the predetermined stable voltage from the voltage regulator circuit is provided to the input of the sampling circuit, a voltage across the second resistor is not greater than a stable voltage of the voltage regulator diode to keep the first transistor off, when the output voltage greater than the stable voltage from the voltage regulator circuit is provided to the input of the sampling circuit, the voltage across the second resistor is greater than the stable voltage of the voltage regulator diode to thereby turn on the first transistor to allow the collector of the first transistor outputting the low level signal to the switching circuit.

17. The power supply system as described in claim 13, wherein the switching circuit comprises a resistor and a transistor, a base of the transistor acting as the input of the switching circuit is connected to the output of the sampling circuit, an emitter of the second transistor is grounded, a collector of the second transistor is connected as the output of the switching circuit to connect to a standby power source of the motherboard via the resistor, wherein when the control terminal of the power connector is controlled to cut off power supply from the power source to the system power source, the standby power source is still supplied with power from the power source.

18. The power supply system as described in claim 17, wherein the standby power source is a 5V standby power source.

19. The power supply system as described in claim 13, wherein the power source is an ATX power source.

20. The power supply system as described in claim 13, wherein the system power source of the voltage regulator circuit is a 3.3V system power source and the predetermined stable voltage is 2.5V.

* * * * *